(12) United States Patent
Michel et al.

(10) Patent No.: US 7,680,076 B2
(45) Date of Patent: Mar. 16, 2010

(54) METHOD FOR COMBINING DATA PACKETS BY A TELECOMMUNICATION DEVICE

(75) Inventors: Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 181 days.

(21) Appl. No.: 11/662,955

(22) PCT Filed: Sep. 2, 2005

(86) PCT No.: PCT/EP2005/054326

§ 371 (c)(1), (2), (4) Date: Mar. 15, 2007

(87) PCT Pub. No.: WO2006/029963

PCT Pub. Date: Mar. 23, 2006

(65) Prior Publication Data

US 2008/0101403 A1 May 1, 2008

(30) Foreign Application Priority Data

Sep. 15, 2004 (EP) .................................. 04021970

(51) Int. Cl.
H04W 4/00 (2009.01)
(52) U.S. Cl. .................... 370/328; 714/749; 455/39
(58) Field of Classification Search ........................ None
See application file for complete search history.

(56) References Cited

U.S. PATENT DOCUMENTS

2002/0129312 A1* 9/2002 Sipola ........................ 714/748
2003/0110435 A1* 6/2003 Wu et al. .................... 714/748
2003/0153276 A1* 8/2003 Terry et al. ................... 455/69
2006/0146889 A1* 7/2006 Malkamaki et al. ......... 370/506
2006/0251079 A1* 11/2006 Kwak et al. ................. 370/394

FOREIGN PATENT DOCUMENTS

| EP | 1 195 938 A1 | 4/2002 |
| EP | 1195938 A1 * | 4/2002 |
| EP | 1 357 695 A2 | 10/2003 |

OTHER PUBLICATIONS

Ericcson, "E-DCH Physical Layer Hybrid ARQ Processing", TSG-RAN WG1 #38, Aug. 2004.
Ericcson, "E-DCH HARQ protocol", 3GPP TSG-RAN WG2 meeting #43, Aug. 2004.
Samsung, "RV Signalling", TSG-RAN WG1 Meeting #38, Aug. 2004.

(Continued)

*Primary Examiner*—Chi H Pham
*Assistant Examiner*—David Andreasen
(74) *Attorney, Agent, or Firm*—Staas & Halsey LLP (57) ABSTRACT

A method combining data packets by a telecommunication device, whereby a first data packet comprising a first retransmission number being received by the telecommunication device on a telecommunication channel, the next data packet being received by the telecommunication device on the telecommunication channel is a second data packet comprising a second retransmission number at a delay time dt after the first data packet, whereby the delay time is determined by a number of retransmission time steps and the first and the second retransmission number is smaller than or equal to a maximum retransmission number, whereas in the case of the second retransmission number being smaller than the maximum retransmission number, the first and the second data packet are combined to a resulting data packet if the difference between the second and the first retransmission number is equal to the number of retransmission time steps.

17 Claims, 3 Drawing Sheets

OTHER PUBLICATIONS

Nokia, "Implicit Redundancy Version for IR HARQ Scheme", 3GPP TSG-RAN WG1 Rel-6 Ad Hoc, Jun. 2004.

Qulacomm Europe, "Link Performance with different RV for Low Data Rates", 3GPP TSG-RAN WG1 #37-bis (R1-040719), Jun. 2004.

Qulacomm Europe, "Link Performance with different RV for High Data Rates", 3GPP TSG-RAN WG1 #37-bis (R1-040720), Jun. 2004.

Motorola, "Synchronous HARQ and reliable signaling during SHO (Enhanced Uplink)", 3GPP TSG-RAN WG1+2, Aug. 2004.

3GPP, "Technical Specification Group Radio Access Network; Feasibility Study for Enhanced Uplink for UTRA FDD (Release 6)", 3GPP TR 25.896, V2.0.0, Apr. 2004.

Communication from the European Patent Office dated Mar. 1, 2005 in the related PCT application No. PCT/EP2005/054326.

* cited by examiner

METHOD FOR COMBINING DATA PACKETS BY A TELECOMMUNICATION DEVICE

CROSS REFERENCE TO RELATED APPLICATIONS

This application is based on and hereby claims priority to Application No. PCT/EP2005/054326 filed on Sep. 2, 2005 and EP Application NO. 04021970.1, filed on Sep. 15, 2004, the contents of which are hereby incorporated by reference.

BACKGROUND

A method for combining data packets uses a telecommunication device, whereby a first data packet comprising a first retransmission number being received by the telecommunication device on a telecommunication channel and the next data packet being received by the telecommunication device on the telecommunication channel is a second data packet comprising a second retransmission number at a delay time dt after the first data packet.

Such methods are known from the art. In communication systems often packet transmission is employed. One example of such a transmission system is the so called E-DCH scheme (E-DCH: Enhanced Dedicated Channel, basically an improvement of the existing UMTS uplink channel) which is right now being standardized as an enhancement of the UMTS system (UMTS: Universal Mobile Telecommunication System).

The outlines of the E-DCH scheme can be found in the 3GPP RAN 1 technical report TR 25.89 v2.0.0 "Feasibility Study for Enhanced Uplink for UTRA FDD (Release 6)", R1-040392, February 2004, Malaga, Spain.

This scheme is designed to make use of a HARQ (HARQ: Hybrid ARQ, Hybrid Automated Retransmission reQuest) scheme. In this scheme packets are transmitted, and if they are not received correctly, a retransmission is transmitted. At the receiver both the initial transmission and the retransmission is taken together to decode the packet. This gives a better performance, as if only the retransmission would be used without regarding previous transmissions (non-hybrid ARQ).

Within this scheme should be made sure, that both received transmissions actually relate to the same transmitted (higher layer) packet i.e. both transmissions are derived from the same information content, the same "higher layer" packet (but may be transmitted using different packets on layer 1).

There are several ways to ensure this: one is a so called synchronous retransmission protocol. In this protocol a retransmission is sent at a fixed time interval after the initial transmission, or the previous retransmission. In this way the receiver knows at which times to expect retransmissions of a given packet. However, the receiver still does not know, whether two transmissions at compatible times in fact relate to the same packet, or whether already the transmission of a new packet has been started. This is in particular the case if the receiver is not able to receive all packets but misses some, e.g. due to interference. If the transmission employs soft handover, that means that more than one receiver tries to receive the packets, it may well be that one receiver has not been able to receive a packet, but another receiver has been able to do so. In this case a new packet can be transmitted next. The receiver which did not receive the first packet must now somehow recognize that this new packet cannot be combined with any previously received packets.

It is further possible to introduce a so called Retransmission Sequence Number (RSN) or retransmission counter: This counter is reset (e.g. to 0) if a new packet is being transmitted, and it is incremented with each retransmission. If the receiver compares the difference in RSN with the difference in time (taking into consideration the synchronous retransmission protocol and the known time difference between retransmission), the receiver can combine the receptions if the differences match and not combine them if the differences do not match.

SUMMARY

It is a problem according to the related art, that the value range of the RSN is at least as large as the maximum number of possible retransmissions (typically if a packet cannot be transmitted with a maximum number of retransmission this packet is dropped and the next packet is transmitted). The maximum number of possible retransmissions can be quite high. This can cause an excessive amount of signaling information, because the RSN has to be transmitted with every packet (re)transmission.

It is one possible task of the presented invention to present an improved retransmission method.

The inventors propose a method to signal retransmissions for packet transmission, in which a retransmission counter is transmitted in addition to each data packet, in which the retransmission counter is reset if a new transmission is transmitted, and is incremented if a retransmission is transmitted and a RSN has not already reached a given maximum value, and the retransmission counter remains at the given maximum value if a retransmission is transmitted and the RSN has already reached the given maximum value.

The task named above is also fulfilled by a method where a receiver combines a received packet with a previously received packet, if a retransmission counter is smaller than a given maximum value and the difference in the retransmission counters is identical with the difference in a transmission time to the last received packet, or the retransmission counter is equal to the given maximum value and the last received packet has been received with the difference in time being at most this maximum value The task named above is also fulfilled by a method where a receiver combines a received packet with a previously received packet, if a retransmission counter is smaller than a given maximum value and the difference in the retransmission counters is identical with the difference in a transmission time to the last received packet, or the retransmission counter is equal to the given maximum value and the last received packet has been received with the difference in time being at most this maximum value and the retransmission counter that last packet plus the time difference is at least the given maximum value.

The method gives an enhancement of the "Retransmission Sequence Number" (RSN) concept, which allows to reduce the value range of RSN while still allowing it to be used to determine which packets to combine, at least for most cases, in particular in those cases where the number of retransmissions does not exceed the maximum value of the RSN. The first and/or the second retransmission numbers according to this application can be designed to be a "Retransmission Sequence Number" according to the previous description.

There may now be some cases where the receiver can now no longer tell whether packets have to be combined, but these cases are rare enough and will not severely harm the performance. It is more valuable to reduce the number of bits needed to encode the RSN, say from 3 bits to 2 bits, which gives a significant reduction of the resources needed to transmit this "overhead" information along with the packet data.

In the following description, the retransmission numbers are abbreviated as RSN.

The RSN concept used as follows:

If a new packet is being transmitted (i.e. at the first transmission of a new packet), the RSN is reset to 0.

If a retransmission of a packet is transmitted, and the RSN is still below its maximum value, then the RSN is incremented (again as in the previous proposal).

If a retransmission of a packet is transmitted, and the RSN has already reached its maximum value, then the RSN is not incremented but remains at the maximum value (contrary to the previous proposal).

We name the maximum value of RSN as RSNMAX for the further discussion (RSNMAX can be a maximum retransmission number).

In the case that the RSN is identical to RSNMAX it is actually not possible that the last received packet has been received with the difference in time being less than RSNMAX and the RSN of that last packet plus the time difference is smaller than RSNMAX. Consequently, strictly speaking, the RSN of the last packet plus the time difference needs not necessarily be computed and compared to RSNMAX. However it is easy to do and in this case some rare error cases may be detected, where the RSN has been decoded incorrectly. This is unlikely as the RSN will have to be coded/protected suitably anyhow, but as the calculation is so easy, it would be advantageous to do it and to exploit this extra consistency check.

For a further explanation, we will present some more detailed examples by reference to the following Table.

| T | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| RSN | 0 | 0 | 1 | 2 | 3 | 3 | 3 | 3 | 3 | 3 | 3 | 3 | 0 | 1 | 2 | 3 | 3 | 3 | 3 |
| RX | 0 | — | 1f | — | 3 | — | — | 3 | — | — | — | 3f | 0 | — | 2 | | | | |
| Hyp | 0 | 1 | 2 | | | | 0 | 1 | 2 | 0 | 1 | 2 | 3 | 3 | 0 | 1 | | | |

The receiver can combine a received packet with the previously received packet, if e.g. one of the following conditions 1 or 2 holds. For this purpose it will take into account also the RSN of the previously received packet (the last received packet) and the time difference since the reception of that packet (the time difference can be a delay time determined by a number of retransmission time steps e.g.). Note that the time difference is identical to the number of increments of the RSN since that last packet, provided that no new packed has been transmitted and that the limitation of RSN to RSNMAX has not happened yet.

1) the RSN is smaller than RSNMAX and the difference in RSN is identical with the difference in transmission time (in this case there was neither an overflow of the RSN nor has a new initial packet been sent)

2) the RSN is identical to RSNMAX, the last received packet has been received with the difference in time being at most RSNMAX and the RSN of that last packet plus the time difference is at least RSNMAX (in this case there may have been an overflow of the RSN, but the packet received corresponds to the last received packet, otherwise the RSN would have been reset to 0 after that last packet, and would not have been increased to RSNMAX because the time difference since then is too small)

The packets may be not combined for example in the following cases 3 or 4:

3) the RSN is smaller than RSNMAX and the difference in RSN is not identical with the difference in transmission time (in this case there was no overflow of the RSN and a new initial packet been sent, therefore the data relating to the old packet can be safely deleted)

4) the RSN is identical to RSNMAX and the last received packet has been received with the difference in time being more than RSNMAX. In this case the receiver cannot determine whether the actual and the last received packets are to be combined, i.e. cannot determine whether there have only been retransmissions of this packet been sent, or whether already a new packet and so many retransmissions of this new packet have been sent, so that the RSN has already reached RSNMAX. Therefore, in order to avoid a potential mixing up of data of different packets, the information relating to the old packet will have to be deleted.

The table shows:

In the first line the time T (in units of transmission times i.e. time difference of retransmission in the synchronous retransmission protocol)

In the second line the actually transmitted RSN

In the third line the received RSN, if no RSN has been received (e.g. due to interference), this is indicated by a dash (–).

Furthermore a "f" indicates that the buffer has been cleared i.e. that the receiver assumes, that the actually received packet cannot be combined with the previous one.

In the forth line, for explanatory purposes, an other potential sequence of transmitted RSN is given to show whether it is possible, that the same RSN has been received but a new packet has already been sent.

According to the present example, at time 0 the RSN is set to 0 and a packet is transmitted.

At time 1 a new packet is transmitted and the RSN is reset to 0 again. This RSN is however not received by the receiver (–).

At time 2, a retransmission of the packet transmitted already at time 1 is transmitted. The receiver recognizes that this packet is not to be combined with the previously received packet, i.e. the packet transmitted at time 0, because the actual RSN is smaller than RSNMAX and the difference of the actual RSN minus the last received RSN (which was 0 at time 0) is 1–0=1 does not match the time difference which is 2 (time 2 minus time 0). This is according to rule 3 named above. Note that if still a retransmission of the packet from time 0 was sent, then the RSN would by now have been incremented to 2 as indicated in the line Hyp. Therefore the receiver can rule out this case.

At time 3 a retransmission is transmitted, but not received.

At time 4 a retransmission is transmitted, the RSN is increased and reaches RSNMAX. The receiver detects this, the time difference since the last received RSN is 2, and the last received RSN (1) plus this time difference gives 3, which is at least RSNMAX. Therefore the packet is combined with the last packet at time 2 according to rule 2.

At time 5 to 6 retransmissions are sent, the RSN stays at RSNMAX.

At time 7 a retransmission is sent, still the RSN stays at RSNMAX. The receiver combines this packet with the previously received packet at time 4 according to rule 2: RSN is RSNMAX, the time difference is 3, i.e. at most RSNMAX and the previous RSN plus the time difference is 6 i.e. at least RSNMAX. If a new packet had been sent since time 4, the RSN would have been reset and could have increased at most to 2 since then as shown in the line Hyp.

At time 8 to 10 retransmissions are sent, the RSN stays at RSNMAX.

At time 11 a retransmission is sent, still the RSN stays at RSNMAX. The receiver does not combine this packet with the previously received packet at time 7 according to rule 4: RSN is RSNMAX, the time difference is 11−7=4, i.e. larger than RSNMAX. A new packet could have been sent at time 8, the RSN would have been reset and could have increased to 3 since then as shown in the line Hyp. Therefore the receiver does not know for sure whether the packet received at time 11 can be combined with the packet at time 7 or not, therefore it has to make a conservative assumption i.e. not combine the data. This is indicated by the letter f at time 11 in line 3.

At time 12 a new packet is sent and received and RSN is reset to 0

At time 13 a retransmission is sent but not received and RSN is incremented to 1

At time 14 a further retransmission is sent and received and the RSN is incremented to 2. The receiver combines this packet with the previously received packet at time 12 according to rule 1: The RSN 2 is still smaller than RSNMAX and the difference in RSN 2−0=2 is identical with the difference in transmission time 14−12=2. The line Hyp shows that if a new packet had been sent (but missed) at time 13 than the RSN would not be 2 but 1.

Further more, it is possible, that in a HARQ system for the same content not identical packets (this is called chase combining) but e.g. differently encoded packets are sent, known e.g. as different redundancy versions (also called incremental redundancy). In this case, also an indication which redundancy version is transmitted with a given packet can be used. This would additionally increase the overhead information. Therefore the signaling of the redundancy version can be performed implicitly with the RSN or implicitly with the time at which the packet is sent. Both transmitter and Receiver can calculate the applied redundancy version (RV) from either the RSN or transmission time (or equivalently to the transmission time a transmission frame number or connection frame number, also called CFN, the latter will be used in the following without intention to restrict others.)

For the improved RSN, the determination of the RV can be done as follows: For the values of RSN below RSNMAX, the RV can be calculated from the RSN. However, when RSN reaches RSNMAX, it will remain at this value for all the remaining retransmissions of the packet. Therefore in this case, it is better to calculate the RV not from RSN but from the CFN. In summary, according to the method the RV is calculated from the RSN if RSN<RSNMAX and from CFN if RSN=RSNMAX.

In a further embodiment, the relation of RV to RSN can be signaled from the receiver to the transmitter before of the transmission, in particular for RSN<RSNMAX.

In a further embodiment there may be a default relationship predefined between transmitter and receiver, which can be replaced by a signaled relationship. The relationship can be signaled e.g. for some values for RSN, in particular for the most often used ones, while for others, e.g. the less often used ones, default values are used. Alternatively, if different packet sizes or coding schemes can be used by the system (this applies in particular for AMC (Adaptive Modulation and Coding) schemes), default values can be used for some sizes/schemes and explicit signaled RV values can be used for others.

Further more there are coding methods, which distinguish between two classes of coded bits, namely systematic bits and parity bits. Basically systematic bits correspond to the information to be transmitted while parity bits provide redundancy information. In such cases it may be beneficial to emphasize systematic bits for the initial transmission, but parity bits in at least some of the retransmissions. In this case it is possible to not signal the fact to emphasize systematic bits in the initial transmission. This can save some transmission bandwidth for signaling the RV to RSN relation. Further more, it may even be sufficient to always use a predefined RV for the initial transmission and only provide explicit signaling of RV to RSN relations for (some of the) retransmissions. Further more, for the case RSN=RSNMAX, it can also be beneficial to emphasize systematic bits. This is in particular true for low encoding rates (i.e. there is a significant redundancy available in a transmitted packet). Then it is possible to also not signal explicitly to emphasize systematic bits for the case RSN=RSNMAX.

The method has presented enhancements to the RSN. It should be noted that there are also other possibilities to provide similar functionality by somewhat different signaling. One such proposal is the NDI (New Data Indicator). The NDI is incremented modulo a maximum value for every new packet but is identical for retransmission of a packet. The NDI scheme may be more robust in cases where there are many retransmissions, because then the NDI is only incremented seldom and there is less risk that it becomes no more unambiguous (e.g. due to wrap around).

According to a further aspect, either the RSN or NDI scheme can be used depending on properties of the connection. That means that even in a single connection sometimes RSN and sometimes NDI can be used depending on the property. Such properties may include the fact whether the connection is or is not in Soft Handover, or the used packet size or coding rate.

In a preferred embodiment the selected property can be determined by the transmitter and receiver without additional explicit signaling. In this case no extra signaling overhead is introduced.

It will be apparent to those versed in the art, that the method can be combined beneficially by combining aspects presented in this application with one another or with other known procedures. The method which was described by example above is therefore considered to be also applicable to those cases. In particular the examples and the description should not be understood to limit the scope of the method.

DETAILED DESCRIPTION OF THE PREFERRED EMBODIMENT

Figure 1:
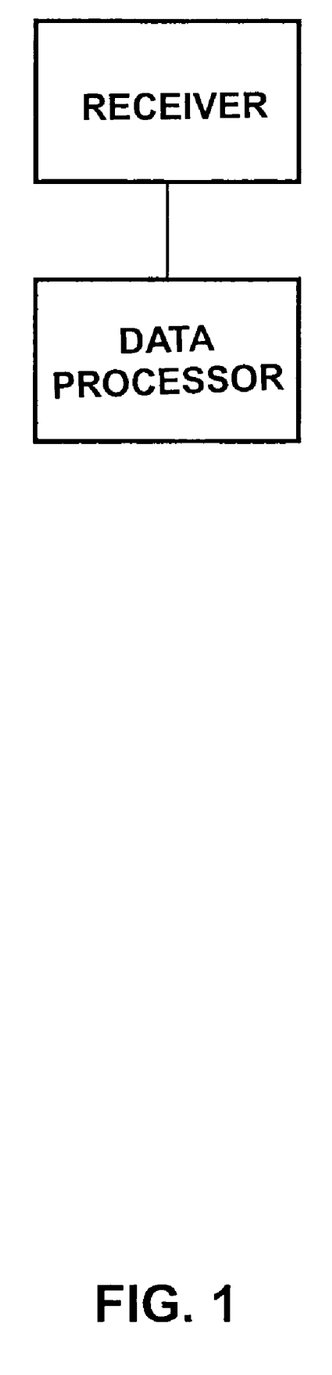
FIG. 1 is a block diagram of a telecommunication device for performing a method for combining data packets.
Figure 2:
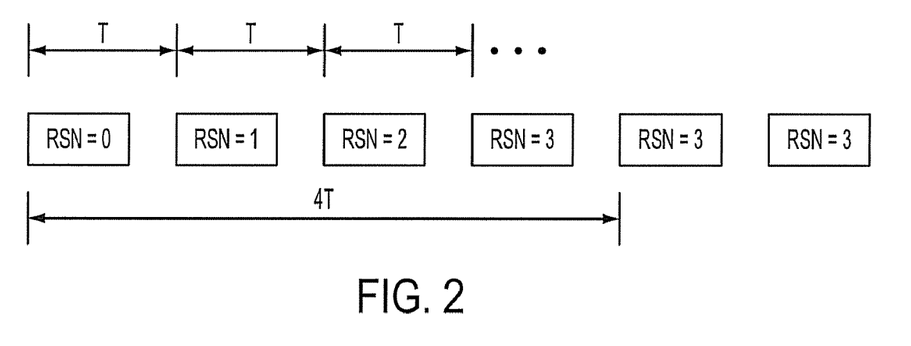
FIG. 2 illustrates a process of combining data packets.
Figure 3:
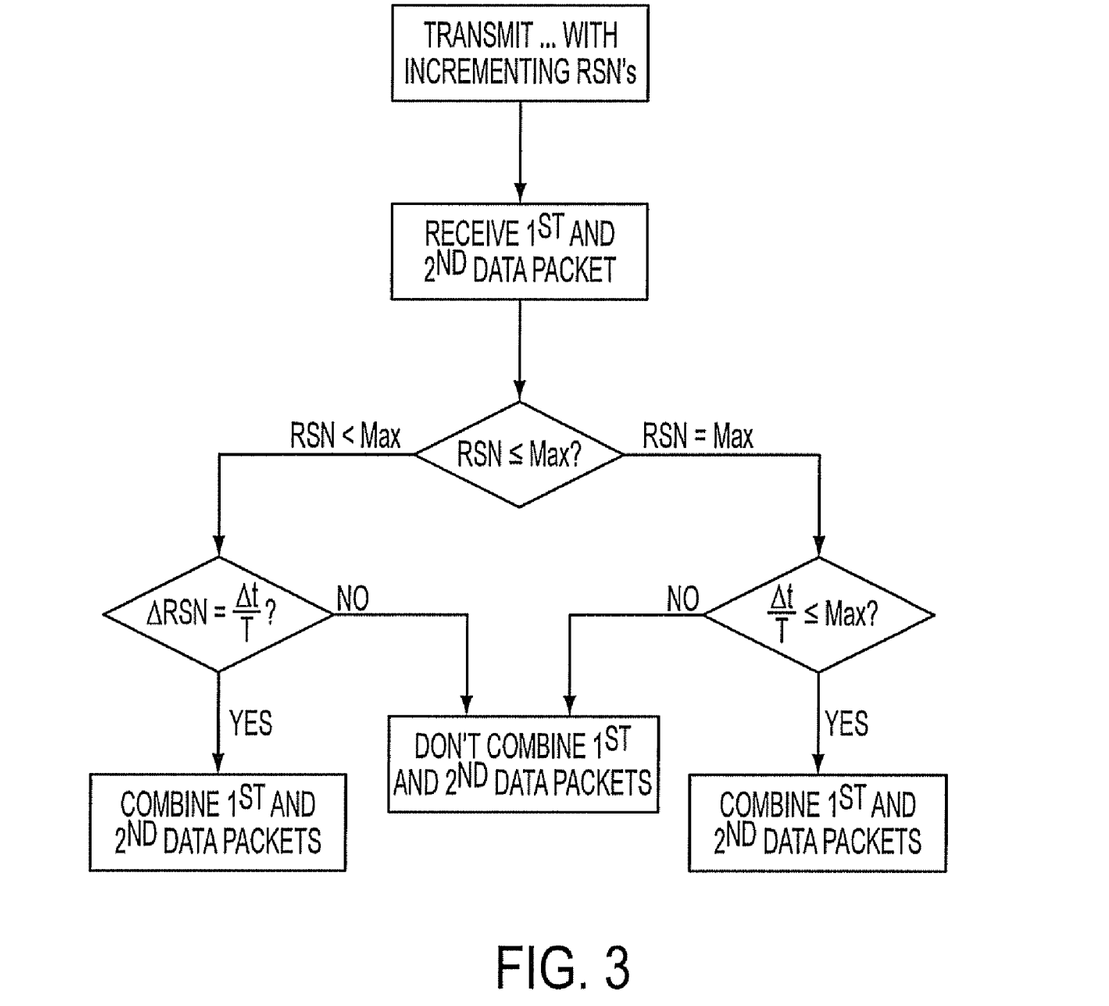
FIG. 3 is a block diagram illustrating a process for combining data packets.

The following text contains some further examples, explanations, embodiments and variants of the method and telecommunication device, as illustrated in FIGS. 1-3 of the drawings.

INTRODUCTION

In the last meeting substantial progress regarding the HARQ definition for E-DCH was made. An important agreement was to have a synchronous protocol with synchronous retransmissions and to have HARQ with IR and Chase combining.

Further while operating IR it was agreed that the redundancy versions are taken in a given order and that the first transmission always emphasizes the systematic bits (s=1). For retransmissions in non SHO both emphasizing and non emphasizing of systematic bits should be possible (s=0 or s=1).

Another agreement for SHO was that the utilization of transmissions always emphasizing the systematic bits (s=1) is generally considered to be beneficial.

Starting from these facts and the agreement that the RV may be linked to the CFN for some E-TFCs and explicitly signalled for other E-TFCs this contribution proposes a solution for the signalling of the HARQ related information.

HARQ Related Signaling Information

The HARQ related signaling information is transmitted with every E-DCH packet transmission together with the E-TFC information. Its function is to inform the Node B about the used redundancy version ($X_{rv}$ value) needed for the de-rate matching as well as to trigger the flushing of the Node B soft buffer.

The redundancy versions and the ordering in which the redundancy versions are applied should be controlled by the network e.g. through higher layer signaling or it can be specified for every TFC using a fixed mapping rule. The rule is known to both the UE and the network and can implemented "hard-wired". In our view for each TFC three redundancy versions (one for the initial transmission, one for the first and one for the second retransmission) should be specified or signaled from higher layers.

In the following due to the different requirements regarding the reliability of the new data indication and the different link efficiency gains for the RV selection in SHO and no SHO we separate the discussion for both cases.

Signaling in case of no SHO

In case of no SHO we propose a 2 bit RSN as described in [1] to signal the applied redundancy version from the UE to the Node B. Additionally the RSN provides the functionality of new data indication (in case the RSN=0 the soft buffer is indicated to be flushed). The RSN is incremented with every retransmission and set to 0 with every initial transmission. In case the number of retransmissions exceeds two the RSN is set to 3 for all further retransmissions. This has the advantage that the number of bits for the RSN can be lower than $\log_2 (N_{max})$ without losing IR gain since the number of different RVs is typically lower than the maximum number of transmissions $N_{max}$. For RSN=3 the RV selection is CFN based to achieve further gain.

Signaling in Case of SHO

As described in [6] in case of SHO specific TFCs are chosen by the UE. Generally the SHO TFCs provide lower rates. For lower rates it was already shown during the study item phase that the IR link efficiency gain compared to Chase combining is around 0.3 dB. However the performance difference between different IR schemes and also between IR schemes with different RV orderings is negligible small [4]. Consequently to achieve the best performance also in SHO we propose to use specific TFCs together with IR. To specify an explicit rule for the RV selection is not reasonable due to the negligible differences of the IR schemes. Therefore we propose to do the RV selection implicitly and based on the CFN similar as described already in several other contributions [2,3].

In SHO then the 2 bit RSN as described for the no SHO case is no longer needed and can be reused. Keeping in mind that the most important issue for the HARQ related signaling in SHO is to avoid Node B buffer corruption we propose to reuse the 2 RSN bits as a 2 bit NDI. In contrast to the RSN, which is incremented per retransmission, the NDI is incremented at the UE with every initial transmission. Compared to the RSN the NDI provides a higher reliability especially in case the residual BLER after the first retransmission is targeted to 1%).

In this document we propose to use only 2 bits for the HARQ related UL E-DCH signaling information used to provide the new data indication and the RV selection functionality.

Depending on the chosen TFC the counter is incremented on a per retransmission (=RSN) or a per initial transmission basis (=NDI) to support the NDI or RV selection functionality as good as possible.

Background for this solution is the given fact, that in case of SHO the NDI reliability is much more critical than in non SHO and that the RV selection in non SHO has much more influence on the performance than in SHO.

Further the proposal comprises also the RV selection in SHO, which is done implicitly using the CFN e.g. as described in [2,3]. In case of no SHO the RVs for the initial transmission and the first and second retransmission is signalled by the network whereas the actual usage is indicated by the UEs RSN.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for combining data packets using a telecommunication device, comprising:

transmitting data packets from a transmitter;

receiving a first data packet at the telecommunication device via a telecommunication channel, the first data packet being associated with a first retransmission number;

receiving a second data packet at the telecommunication device via the telecommunication channel, the second data packet being the next received data packet after the first data packet, the second data packet being received at a delay time after receipt of the first data packet, the second data packet being associated with a second retransmission number;

incrementing retransmission numbers for the data packets if a data packet is retransmitted, the retransmission numbers being incremented up to a maximum retransmission number such that once the maximum retransmission number is reached, the retransmission number remains at the maximum retransmission number for all further retransmissions of a data packet, if any; and retransmitting data packets at a fixed time interval after an initial transmission or a previous retransmission, such that the delay time is determined by a number of retransmission time steps, wherein if the second retransmission number is less than the maximum retransmission number and a difference between the second and the first retransmission numbers is equal to the number of retransmission time steps, the first and the second data packets are combined to a resulting data packet, and the first and second data packets are not combined to a resulting data packet if the second retransmission number is less than the maximum retransmission number and the difference between the second and the first retransmission numbers is not equal to the number of retransmission time steps.

2. The method according to claim 1, whereby a first content is transmitted in the first data packet, a second content is transmitted in the second data packet, if the second content is different from the first content, the second retransmission number is set to zero, if the second content is the same as the first content and the first retransmission number is less than the maximum retransmission number, then the second retransmission number is equal to the first retransmission number increased by one, and if the second content is the same as the first content and the first retransmission number is equal to the maximum retransmission number, then the second retransmission number is equal to the first retransmission number.

3. The method according to claim 1, wherein a hybrid automated retransmission request scheme is used.

4. The method according to claim 1, wherein a redundancy version is calculated depending on the first and/or the second retransmission number.

5. The method according to claim 4, wherein the redundancy version is calculated depending on the first and/or the second retransmission number if the first and/or the second retransmission number is less than the maximum retransmission number.

6. The method according to claim 4, wherein the redundancy version is calculated depending on a transmission frame number if the first and/or the second retransmission number is equal to the maximum retransmission number.

7. A telecommunication devices, comprising;

a receiver receiving a first data packet via a telecommunication channel, the first data packet being associated with a first retransmission number, and receiving a second data packet via the telecommunication channel, the second data packet being the next received data packet after the first data packet, the second data packet being received at a delay time after receipt of the first data packet, the second data packet being associated with a second retransmission number, wherein retransmission numbers are incremented for the data packets if a data packet is retransmitted, the retransmission numbers being incremented up to a maximum retransmission number such that once the maximum retransmission number is reached, the retransmission number remains at the maximum retransmission number for all further retransmissions of a data packet, if any, and wherein data packets are retransmitted at a fixed time interval after an initial transmission or a previous retransmission, such that the delay time is determined by a number of retransmission time steps; and a data processor combining the first and the second data packets to a resulting data packet if the second retransmission number is less than the maximum retransmission number and a difference between the second and the first retransmission numbers is equal to the number of retransmission time steps, and not combining the first and second data packets to a resulting data packet if the second retransmission number is less than the maximum retransmission number and the difference between the second and the first retransmission numbers is not equal to the number of retransmission time steps.

8. The telecommunication device according to claim 7, where the telecommunication device is a mobile telecommunication device or a base station equipment or a radio network controller equipment or a base station controller equipment.

9. A method for combining data packets using a telecommunication device, comprising:

transmitting data packets from a transmitter;

receiving a first data packet at the telecommunication device via a telecommunication channel, the first data packet being associated with a first retransmission number;

receiving a second data packet at the telecommunication device via the telecommunication channel, the second data packet being the next received data packet after the first data packet, the second data packet being received at a delay time after receipt of the first data packet, the second data packet being associated with a second retransmission number;

incrementing retransmission numbers for the data packets if a data packet is retransmitted, the retransmission numbers being incremented up to a maximum retransmission number such that once the maximum retransmission number is reached, the retransmission number remains at the maximum retransmission number for all further retransmissions of a data packet, if any; and retransmitting data packets at a fixed time interval after an initial transmission or a previous retransmission, such that the delay time is determined by a number of retransmission time steps, wherein if the second retransmission number is equal to the maximum retransmission number and the number of retransmission time steps is less than or equal to the maximum retransmission number, the first and the second data packets are combined to a resulting data packet, and the first and the second data packets are not combined to a resulting data packet if the second retransmission number is equal to the maximum retransmission number and the number of retransmission time steps is greater than the maximum retransmission number.

10. The method according to claim 9, whereby if (i) the second retransmission number is equal to the maximum retransmission number, (ii) the number of retransmissions is less than or equal to the maximum retransmission number and (iii) the sum of the first retransmission number and the number of retransmissions is equal to or greater than the maximum retransmission number, then the first and the second data packet are combined to a resulting data packet.

11. The method according to claim 9, whereby a first content is transmitted in the first data packet, a second content is transmitted in the second data packet, if the second content is different from the first content, the second retransmission number is set to zero, if the second content is the same as the first content and the first retransmission number is less than the maximum retransmission number, then the second retransmission number is equal to the first retransmission number increased by one, and if the second content is the same as the first content and the first retransmission number is equal to the maximum retransmission number, then the second retransmission number is equal to the first retransmission number.

12. The method according to claim 9, wherein a hybrid automated retransmission request scheme is used.

13. The method according to claim 9, wherein a redundancy version is calculated depending on the first and/or the second retransmission number.

14. The method according to claim 13, wherein the redundancy version is calculated depending on the first and/or the second retransmission number if the first and/or the second retransmission number is less than the maximum retransmission number.

15. The method according to claim 13, wherein the redundancy version is calculated depending on a transmission frame number if the first and/or the second retransmission number is equal to the maximum retransmission number.

16. A telecommunication devices, comprising;
a receiver receiving a first data packet via a telecommunication channel, the first data packet being associated with a first retransmission number, and receiving a second data packet via the telecommunication channel, the second data packet being the next received data packet after the first data packet, the second data packet being received at a delay time after receipt of the first data packet, the second data packet being associated with a second retransmission number, wherein retransmission numbers are incremented for the data packets if a data packet is retransmitted, the retransmission numbers being incremented up to a maximum retransmission number such that once the maximum retransmission number is reached, the retransmission number remains at the maximum retransmission number for all further retransmissions of a data packet, if any, and wherein data packets are retransmitted at a fixed time interval after an initial transmission or a previous retransmission, such that the delay time is determined by a number of retransmission time steps; and
a data processor combining the first and the second data packets to a resulting data Packet if the second retransmission number is equal to the maximum retransmission number and the number of retransmission time steps is less than or equal to the maximum retransmission number, and not combining the first and second data packets to a resulting data packet if the second retransmission number is equal to the maximum retransmission number and the number of retransmission time steps is greater than the maximum retransmission number.

17. The telecommunication device according to claim 16, where the telecommunication device is a mobile telecommunication device or a base station equipment or a radio network controller equipment or a base station controller equipment.

* * * * *

UNITED STATES PATENT AND TRADEMARK OFFICE
CERTIFICATE OF CORRECTION

PATENT NO.         : 7,680,076 B2
APPLICATION NO.    : 11/662955
DATED              : March 16, 2010
INVENTOR(S)        : Jurgen Michel et al.

It is certified that error appears in the above-identified patent and that said Letters Patent is hereby corrected as shown below:

Title Page; item (56);
First Page, Column 2 (Other Publications), Line 1, change "Ericcson," to --Ericsson,--.

First Page, Column 2 (Other Publications), Line 3, change "Ericcson," to --Ericsson,--.

Second Page, Column 1 (Other Publications), Line 3, change "Qulacomm" to --Qualcomm--.

Second Page, Column 1 (Other Publications), Line 6, change "Qulacomm" to --Qualcomm--.

Column 2, Line 40, after "value" insert --.--.

Column 5, Line 23, after "0" insert --.--.

Column 5, Line 25, after "1" insert --.--.

Column 7, Line 56, change "Case" to --case--.

Column 9, Line 39, change "devices," to --device,--.

Column 11, Line 13, change "devices," to --device,--.

Column 12, Line 11, change "Packet" to --packet--.

Signed and Sealed this

First Day of June, 2010

David J. Kappos
*Director of the United States Patent and Trademark Office*